Patented Sept. 25, 1945

2,385,444

UNITED STATES PATENT OFFICE 2,385,444

SECONDARY CHLORIDES OF NEOHEXANE

Aaron W. Horton, Thorofare, N. J., assignor to Socony-Vacuum Oil Company, Incorporated, a corporation of New York No Drawing. Application September 17, 1942, Serial No. 458,753

2 Claims. (Cl. 204—163)

This invention relates to a process for preparing secondary chlorides of neohexane.

The chlorination of paraffin hydrocarbons in general is a well-known process. It may be carried out with or without catalysts or special illumination. Chlorination, under the usual conditions employed, is practically non-preferential; that is, the rate of substitution of chlorine for primary, secondary or tertiary hydrogens is approximately the same. However, it is highly desirable in the case of neohexane to be able to produce secondary rather than primary chlorides, the secondary chloride being an important intermediate compound for the synthesis of such high-octane fuels as triptane and di-isopropyl. So far as is known, the only prior attempt in this line was made by Whitmore and co-workers (see J. A. C. S. 60, 2539 (1938)). The temperature used by these workers was 25° F. and a yield of 11% secondary chlorides was reported.

The present invention contemplates preferential chlorination of the secondary carbon atom of neohexane. The secondary chloride thus produced is important as an intermediate compound in the preparation of triptane and di-isopropyl and related high-octane hydrocarbons. This specificity of chlorination is achieved by reducing the reaction temperature to 15° F. or below, preferably between —30° F. and +15° F. The reaction may be carried out either non-catalytically or with the aid of visible or ultra-violet illumination, and a surface catalyst, such as active carbon. Under these conditions, the ratio of secondary to primary chlorides formed is about two to one, the yield of secondary mono-chloride being 45–50 per cent as compared to Whitmore's 11 per cent yield.

In the laboratory, the low temperatures are attained by immersing the reaction flask in a Dry Ice-acetone bath. In commercial practice, the same result is obtained by refrigeration. It has been found inadvisable to reduce the temperature below —30° F., first, because of increased refrigeration costs and, second, because of the slowness of reaction rate below —30° F. Other catalysts, such as the metallic halides commonly used, cause loss of specificity in chlorination as well as increasing the yields of undesirable di-chlorides.

Example I

Sixty-four grams of gaseous chlorine were bubbled into 285 grams of neohexane with stirring over a period of 6 hours. The reaction flask was kept at —15° to 0° F. and illuminated by a 100-watt tungsten lamp. Excess neohexane was removed by distillation after the reaction was completed and the residual chlorides separated by fractionation.

Results of fractional distillation were as follows:

|   | Boiling range | Weight | Composition | Yield |
|---|---|---|---|---|
|   | °F | Grams |   | Percent |
| 1 | 212–230 | 52 | 2°-chloride | 48 |
| 2 | 237–248 | 25 | 1°-chlorides | 23 |
| Residue | >248 | 11 | Di-chlorides |   |

Example II

Forty-one grams of gaseous chlorine were bubbled into 195 grams of neohexane with stirring over a period of 3½ hours. The reaction was catalyzed by 3 grams of active carbon. The flask was kept at —30 to —20° F. and illuminated by a 100-watt tungsten lamp. After removal of excess neohexane, the chlorides were fractionated. Results of this fractionation were as follows:

|   | Boiling range | Weight | Composition | Yield |
|---|---|---|---|---|
|   | °F. | Grams |   | Percent |
| 1 | 212–230 | 30 | 2°-chloride | 44 |
| 2 | 237–248 | 15 | 1°-chlorides | 22 |
| Residue | >248 | 8 | Di-chlorides |   |

With the apparatus used in the above examples, some of the chlorine escapes as gas before it can react with the neohexane. In commercial practice, of course, this chlorine is recovered by condensation and returned to the reaction mixture, making the over-all yield of chlorides practically quantitative.

I claim:

1. The process for obtaining high yields of secondary mono-chlorides of neohexane, which comprises contacting neohexane with chlorine in the presence of light and at temperatures below about 15° F.

2. In the process of preparing secondary mono-chlorides of neohexane, which includes treating neohexane with chlorine; the improvement which comprises contacting neohexane with chlorine in the presence of light and at temperatures varying between about minus 30° F. and about 15° F., whereby high yields of secondary mono-chlorides of neohexane are obtained.

AARON W. HORTON.